(12) United States Patent
Haussmann et al.

(10) Patent No.: US 7,970,256 B2
(45) Date of Patent: Jun. 28, 2011

(54) FAST PLAY DVD

(75) Inventors: Robert Haussmann, Sun Valley, CA (US); Colette Moore, Burbank, CA (US); Benn Carr, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 75 days.

(21) Appl. No.: 10/757,089

(22) Filed: Jan. 13, 2004

(65) Prior Publication Data

US 2004/0179810 A1    Sep. 16, 2004

Related U.S. Application Data

(60) Provisional application No. 60/439,943, filed on Jan. 13, 2003.

(51) Int. Cl.
*H04N 9/80*    (2006.01)
(52) U.S. Cl. ........................................ 386/241; 386/344
(58) Field of Classification Search ................... 386/46, 386/95, 125, 126, 92, 123, 200, 241, 344
See application file for complete search history.

(56) References Cited

U.S. PATENT DOCUMENTS

| | | |
|---|---|---|
| 4,449,198 A | 5/1984 | Kroon et al. |
| 4,860,122 A | 8/1989 | Kanamaru |
| 5,155,600 A | 10/1992 | Maeda |
| 5,161,034 A | 11/1992 | Klappert |
| 5,351,132 A | 9/1994 | Sawabe et al. |
| 5,457,669 A | 10/1995 | Kim et al. |
| 5,477,516 A | 12/1995 | Takezawa |
| 5,491,704 A | 2/1996 | Duron |
| 5,504,585 A | 4/1996 | Fujinami et al. |
| 5,510,906 A | 4/1996 | Yagasaki et al. |
| 5,570,340 A | 10/1996 | Lee et al. |
| 5,592,450 A | 1/1997 | Yonemitsu et al. |
| 5,594,709 A | 1/1997 | Nagano et al. |
| 5,596,564 A | 1/1997 | Fukushijma et al. |
| 5,596,565 A | 1/1997 | Yonemitsu et al. |
| 5,630,006 A * | 5/1997 | Hirayama et al. ............. 386/92 |
| 6,038,367 A | 3/2000 | Abecassis |
| 6,141,004 A | 10/2000 | Jeong |
| 6,341,196 B1 | 1/2002 | Ando et al. |
| 6,424,793 B1 | 7/2002 | Setogawa et al. |

(Continued)

FOREIGN PATENT DOCUMENTS

EP    0757350    2/1997

(Continued)

OTHER PUBLICATIONS

Disney Pixar, Monster Inc DVD Movies, 2001.*

(Continued)

*Primary Examiner* — Huy T Nguyen
(74) *Attorney, Agent, or Firm* — Ference & Associates LLP

(57) ABSTRACT

A medium having a plurality of data blocks stored therein is disclosed. The medium can be a DVD. The plurality of data blocks can be viewed by playing the medium in a medium player. The medium player can be a DVD player. A first instruction set instructs the medium player to play the plurality of data blocks of the medium in a pre-determined sequence. Further, a second instruction set instructs the medium player to play the plurality of data blocks of the medium in response to user commands that determine the order for playing the plurality of data blocks of the medium.

33 Claims, 5 Drawing Sheets

U.S. PATENT DOCUMENTS

| | | | |
|---|---|---|---|
| 6,453,459 B1 | 9/2002 | Broderson et al. | |
| 6,470,140 B1 | 10/2002 | Sugimoto et al. | |
| 6,487,364 B2 | 11/2002 | Okada et al. | |
| 6,895,170 B1 * | 5/2005 | Lambert et al. | 386/95 |
| 7,116,898 B2 | 10/2006 | Hashimoto | |
| 7,283,732 B2 * | 10/2007 | Tsujimoto | 386/126 |
| 2002/0141741 A1 | 10/2002 | Zou et al. | |
| 2003/0044171 A1 | 3/2003 | Otsuka et al. | |
| 2003/0053382 A1 * | 3/2003 | Tsujimoto | 369/30.26 |
| 2003/0113096 A1 * | 6/2003 | Taira et al. | 386/46 |
| 2003/0194212 A1 | 10/2003 | Akita et al. | |
| 2004/0136698 A1 * | 7/2004 | Mock | 386/123 |

FOREIGN PATENT DOCUMENTS

| | | |
|---|---|---|
| JP | H11-341443 | 10/1999 |
| JP | 2001-352523 | 12/2001 |
| JP | 2002-074908 | 3/2002 |
| JP | 2002074913 | 3/2002 |
| JP | 02002074913 A * | 3/2002 |
| WO | WO 99/08282 | 2/1999 |

OTHER PUBLICATIONS

Go Video DV2130 User's Guide, Dec. 7, 2004, pp. 51 and 65.*

Taylor, "DVD Demystified—$2^{nd}$ Edition," 2001 McGraw-Hill, NY, NY, USA, pp. 255-288.

Search Report dated Jun. 5, 2008 from corresponding European Application No. 04701781.9.

International Search Report mailed Aug. 19, 2005, in PCT Application PCT/US04/00757 filed Jan. 13, 2004 (international filing date).

* cited by examiner

FAST PLAY DVD

RELATED APPLICATIONS

This application claims priority to U.S. Provisional Patent Application No. 60/439,943, entitled "EASY START DVD", filed on Jan. 13, 2003. The contents of that application are incorporated by reference herein.

BACKGROUND

1. Field

A system and method are disclosed which generally relate to playing data stored on a medium.

2. General Background

DVD's and DVD players are relatively new, but have grown in popularity very quickly. DVD sales totaled four and one third billion dollars in the year 2002. DVD sales are projected to continue to increase, almost doubling consumer spending by 2006. Sales of DVD's are anticipated to grow from 52% of consumer spending in 2001 to 83% of spending to 2006.

Research has shown, however, that many children cannot operate DVD players. As such, research has also shown that the percentage of family or children's movies purchased in DVD format is lower than the percentage of other categories of movies purchased in DVD format. Some of the difficulty in using DVD's may lie in the main menu which allows the user to select various functions upon insertion into the DVD player. The user must navigate the menu with a remote control or the buttons positioned on the player in order to play the film on the DVD. Children may not know how to use the remote control, or be able to locate the proper function for playing the DVD. Some adults even find this menu system confusing. In addition, playing DVD's can be quite difficult for the elderly and handicapped.

Furthermore, research has also shown that only 62% of DVD owners view trailers or previews at least sometimes, as compared to 76% of VHS owners. In addition, family titles will represent only 25% of total sales in 2003 as compared with 44% of VHS sales in 1999. Further, in 2003, children viewed 14% less of the trailers stored on DVDs than trailers stored on VHS tapes. The value of advertising lost from lower trailer viewing is sizable and difficult to replace with traditional media.

SUMMARY OF THE INVENTION

In one aspect, a method of automatically playing the contents of a digital video disc is disclosed. The method links the contents of the digital video disc in a sequence. Further, the method provides a main menu with a pre-determined timeout. In addition, the method proceeds to play the contents of the DVD in sequence after the predetermined timeout has lapsed without any interaction from a user.

In another aspect, a medium having a plurality of data blocks stored therein is disclosed. The plurality of data blocks can be viewed by playing the medium in a medium player. A first instruction set instructs the medium player to play the plurality of data blocks of the medium in a pre-determined sequence. Further, a second instruction set instructs the medium player to play the plurality of data blocks of the medium in response to user commands that determine the order for playing the plurality of data blocks of the medium.

In yet another aspect, a method of playing a plurality of data blocks of a medium is disclosed. The method automatically plays the plurality of data blocks of the medium in a pre-determined sequence. Upon receiving an input from a user, the method interrupts the playing of the plurality of data blocks of the medium in the predetermined sequence. The method provides a menu to the user so that the user can select the plurality of data blocks of the medium that the user would like to view. Finally, the method plays the plurality of data blocks of the medium that the user has chosen from the menu.

In another aspect, a method of playing a plurality of data blocks of a medium in a user friendly manner is disclosed. The method provides a menu to a user for selecting the plurality of data blocks of the medium to be viewed. Upon not receiving an input within a pre-determined time interval from the user selecting the plurality of data blocks of the medium to be viewed, the method automatically plays the plurality of data blocks of the medium in a pre-determined sequence.

In yet another aspect, a method of viewing the contents stored on a medium is disclosed. The method automatically plays a first set of data blocks of the medium in a pre-ordered viewing mode. Upon receiving an input from a user, the method interrupts the pre-ordered viewing mode. Further, the method provides a menu to the user so that the user can select either the pre-ordered viewing mode or a standard viewing mode, wherein the user can select a subset of a second set of data blocks to view in the standard viewing mode. In addition, the method resumes the playing of the first set of data blocks at the point of interruption in the pre-ordered viewing mode if the user selects the pre-ordered viewing mode. The method initiates the playing of the subset of the second set of data blocks in the standard viewing mode at the point of interruption in the first set of data blocks if the user selects the subset of the second set of data blocks to coincide with the first set of data blocks. The method initiates the playing of the subset of the second set of data blocks in the standard viewing mode at the beginning of the subset of the second set of data blocks if the user selects the subset of the second set of data blocks such that the subset of the second set of data blocks does not coincide with the first set of data blocks.

BRIEF DESCRIPTION OF THE DRAWINGS

By way of example, reference will now be made to the accompanying drawings.

DETAILED DESCRIPTION OF THE INVENTION

A method and system are disclosed for making the viewing of DVDs more user friendly. A DVD player can operate according to computerized instructions stored on the DVD itself. When a DVD is inserted into a DVD player, a controller stored in the DVD player reads the instructions off of the DVD. The controller then issues instructions for playing the content stored on the DVD.

In one embodiment, a bimodal DVD allows the user to view the DVD in two modes. The first mode is a standard DVD viewing mode. The second mode is a pre-ordered viewing mode that does not require the user to interact with the DVD other than inserting the DVD into a DVD player. The pre-ordered viewing mode allows the user to view a DVD in the same fashion as a VHS tape. The user does not even have to touch a remote control in order to view the contents of the DVD. The pre-ordered viewing mode provides a set of instructions to the DVD player for a viewing order for previews, feature presentations, bonus materials, sneak peeks, etc. In one embodiment, at the completion of the pre-ordered viewing, the pre-ordered viewing mode includes an instruction that instructs the DVD player to loop back to the beginning of the pre-ordered viewing contents so that the pre-ordered viewing is repeated.

In one embodiment, the pre-ordered viewing mode is a default mode. If the user would like to use the standard DVD viewing mode, the user can interrupt the pre-ordered viewing mode to make a selection from the standard DVD viewing mode. The bimodal DVD allows a user to view a DVD in an interactive manner or in a non-interactive manner. In yet another embodiment, the standard DVD viewing mode is the default mode.

In alternative embodiments, multimodal DVDs can be used. In other words, the DVD can have more than two modes. In yet another embodiment, the bimodal configuration can be used with other media for storing video or audio data that will be recognized by one of ordinary skill in the art.

Figure 1:
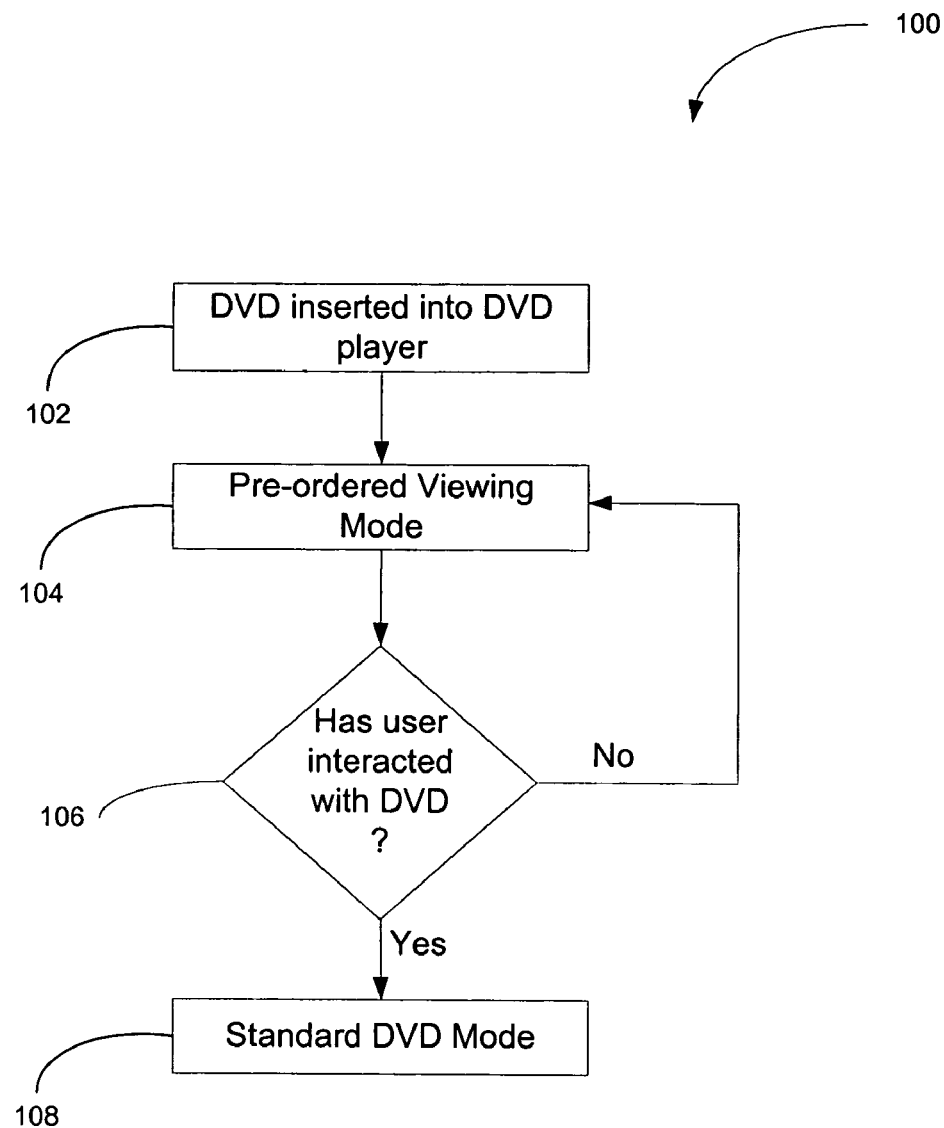
FIG. 1 illustrates a process for selecting between a pre-ordered viewing mode and a standard DVD mode of a bimodal configuration where the pre-ordered viewing mode is the default mode.

FIG. 1 illustrates a process 100 for selecting between the pre-ordered viewing mode and the standard DVD mode of the bimodal configuration where the pre-ordered viewing mode is the default mode. At a process block 102, a DVD is inserted into a DVD player. The DVD automatically starts playing after the DVD is inserted into the DVD player. At a process block 104, the DVD is in a pre-ordered viewing mode. During the pre-ordered viewing mode, the process 100 periodically checks a decision block 106 to determine if the user has interacted with the DVD. If the user has not interacted with the DVD, the DVD continues playing in the pre-ordered viewing mode. If the user has interacted with the DVD, the DVD switches modes from the pre-ordered viewing mode to the standard DVD mode. In one embodiment, a menu is displayed in the standard DVD mode for the user to make a selection. In yet another embodiment, a menu is displayed when the user interacts with the DVD to provide the user with a choice of continuing the pre-ordered viewing mode or proceeding to the standard DVD mode. In one embodiment, if the user chooses to continue in the pre-ordered viewing mode, the DVD resumes playing at the point in the pre-ordered sequence at which the user interacted with the DVD. In one embodiment, the user can also resume playing of the DVD at the point at which the user interacted with the DVD in the standard DVD viewing format. In another embodiment, the user can switch modes and resume playing the contents of the DVD in the new mode. For instance, if a user is watching a movie in the pre-ordered viewing format and interacts with the DVD to change modes to the standard viewing format, the user can resume viewing the movie from the point of interruption even though the viewing mode has changed to the standard viewing format. Therefore, the bimodal configuration can provide a bimodal resume function.

If the data that the user wishes to view in a new mode is a subset of the data that the user viewed in the original mode, the user can resume the viewing of the subset. The subset is not limited to feature presentations such as movies. The subset can be the trailers, sneak peaks, or any data content stored on the DVD.

In another embodiment, the DVD viewing mode is the default mode. In one embodiment, if the user does not interact with the DVD in the standard viewing mode, a timeout occurs after a predetermined amount of time so that the pre-ordered viewing mode automatically begins. For example, the timeout can be 15 seconds. Any predetermined amount of time can be used for the timeout.

Figure 2:
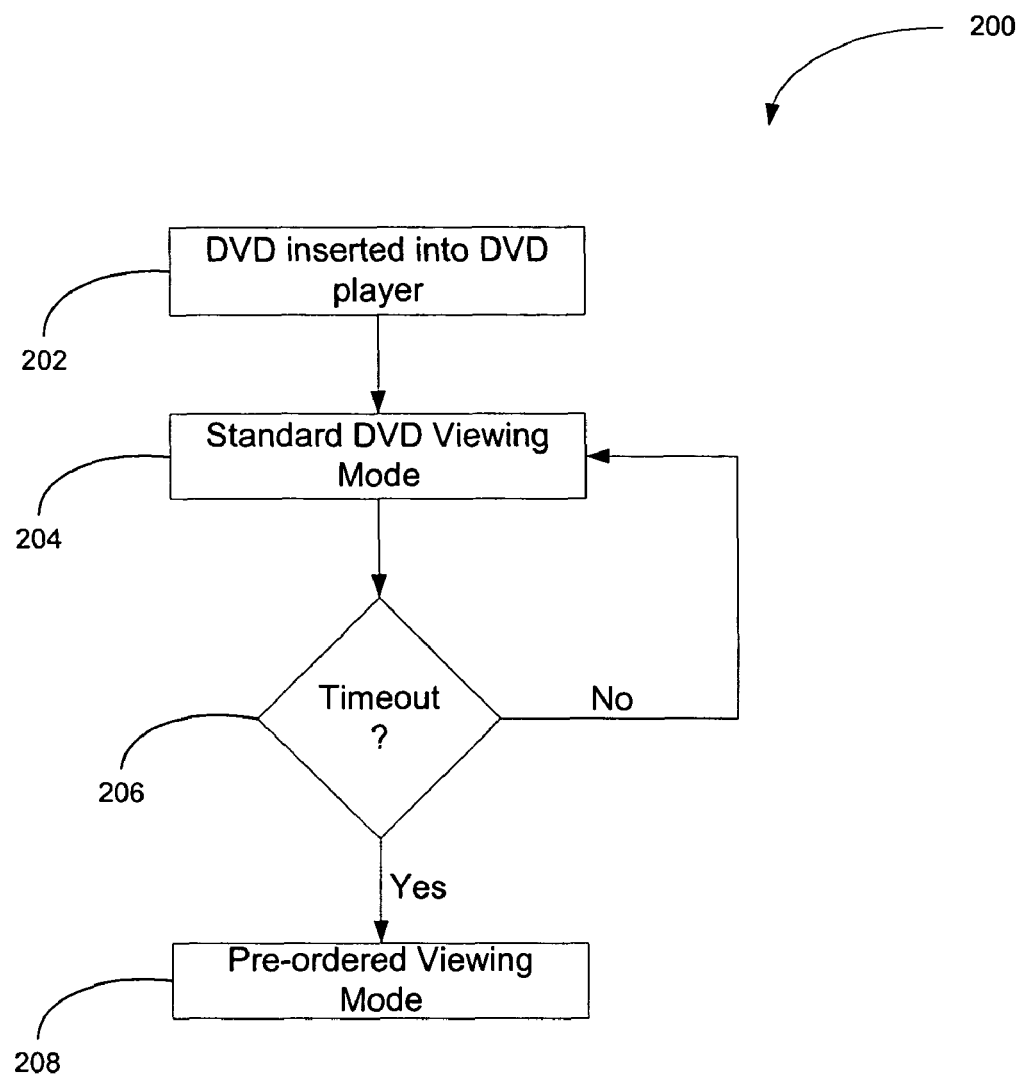
FIG. 2 illustrates a process for selecting between the pre-ordered viewing mode and the standard DVD mode of the bimodal configuration where the standard DVD viewing mode is the default mode.

FIG. 2 illustrates a process 200 for selecting between the pre-ordered viewing mode and the standard DVD mode of the bimodal configuration where the standard DVD viewing mode is the default mode. At a process block 202, the DVD is inserted into the DVD player. At a process block 204, the DVD is viewed in the standard viewing mode. Accordingly, the standard viewing mode requires the user to interact with the DVD. The process 200 periodically checks a decision block 206 to see if a timeout has occurred. The timeout can be for any period of time. If the user has made a menu selection before the time period expires, then there is no timeout and the DVD plays in standard DVD viewing mode at the process block 204. However, if the timeout occurs at the decision block 206, then the process 200 advances to a process block 208, where the DVD is played in a pre-ordered viewing mode.

One of ordinary skill in the art will recognize a variety of methods for storing and accessing the contents of the DVD for viewing in either the pre-ordered viewing format or the standard DVD viewing format. For instance, each mode can include a set of instructions and pointers for accessing the contents stored on the DVD. The standard viewing format can include instructions and pointers to contents of the DVD based upon user input. Further, the pre-ordered viewing format can include an ordered set of instructions and pointers for the pre-ordered viewing of the contents on the DVD. In another embodiment, the contents of the DVD can be stored multiple times on the DVD according to each viewing format. One of ordinary skill in the art will recognize any other optimal storage and access method for each viewing format.

The selection of the modes discussed above can be accomplished through an instruction set selector. In one embodiment, computer code stored on the DVD that sets the default mode and rules for switching between different modes can be the instruction set selector. In another embodiment, the instruction set selector can be a visual menu in which the user determines which mode is the default mode. In one embodiment, the user can also use the visual display to set the rules for selecting between the modes. In another embodiment, the instruction set selector is a physical input device in which the user inputs the default mode and/or rules through a physical device operably connected to or operably integrated with the DVD player.

Figure 3:
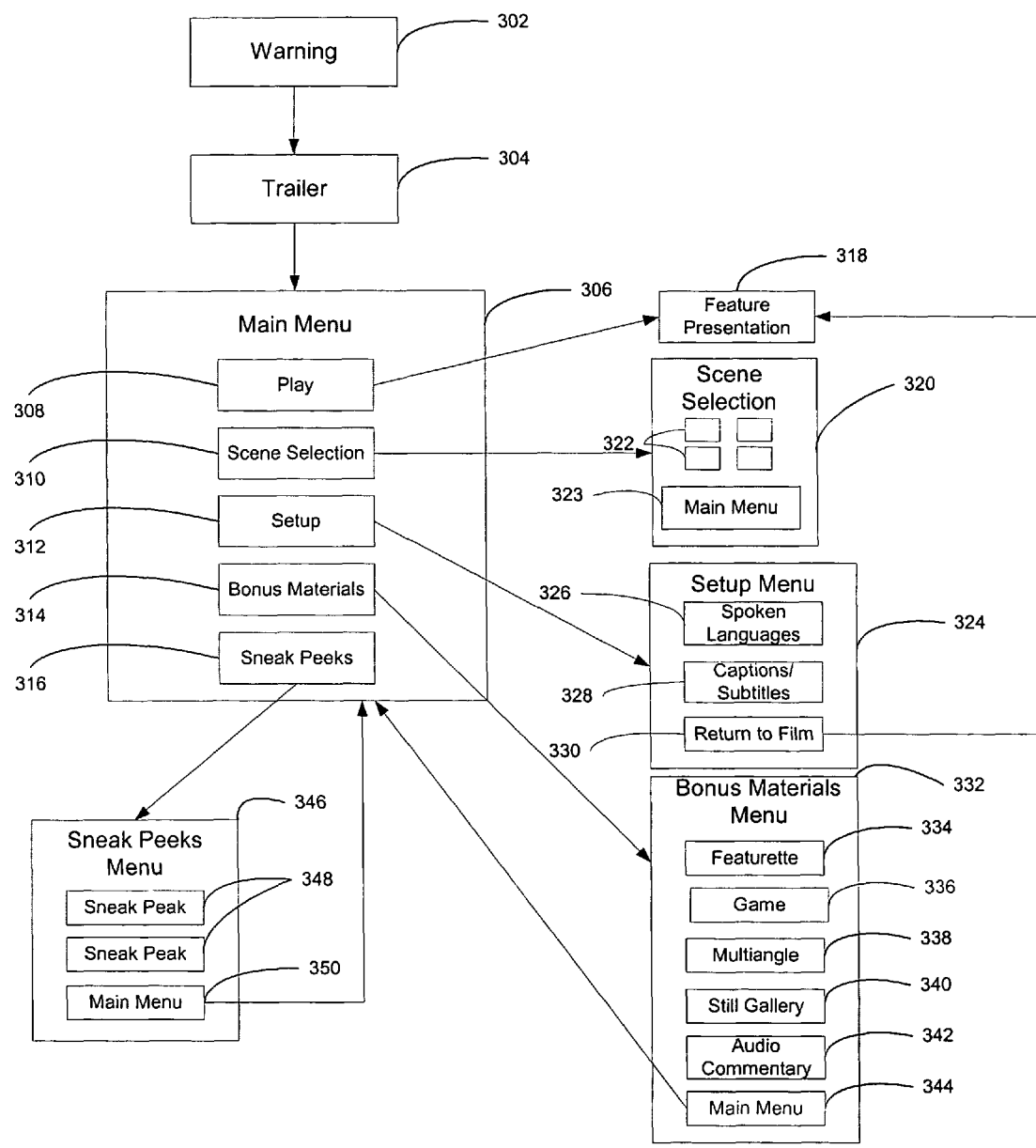
FIG. 3 illustrates an embodiment in which instructions are stored on a DVD for displaying the contents of the DVD in a standard viewing format.

FIG. 3 illustrates an embodiment in which instructions are stored on a DVD for displaying the contents of the DVD in a standard viewing format. In one embodiment, a warning 302 is displayed. The warning 302 can be an FBI warning. The warning 302 can also include restrictions regarding use. A trailer 304 is then displayed. The trailer 304 can include movie previews. Further, the trailer 304 can include advertisements. After the trailer 304 is displayed, a main menu 306 is displayed so that the user can interact with the DVD to make a viewing choice. In one embodiment, the trailer 304 is followed by additional trailers 304 prior to the main menu 306 being displayed.

The main menu 306 can be displayed on any video display known to one of ordinary skill in the art. In one embodiment, the main menu 306 displays a play button 308, a scene selection button 310, a setup button 312, a bonus materials button 314, and a sneak peaks button 316. The user can use any mechanism for making menu selections that is known to one ordinary skill in the art. The user can use a remote control, buttons positioned on a DVD player, touch screen buttons that allow the user to make selections by touching the screen, a mouse pointer, etc.

The user can press the play button 308 to play a feature presentation 318. Accordingly, the feature presentation 318 can be a movie. The user can also press a scene selection button 310 to view individual scenes of the feature presentation 318. After the user presses the scene selection button 110, the user can choose from a plurality of scenes 322 to view. The user can press a scene selection main menu button to return to the main menu 306.

The user can also press the setup button 312 in the main menu 306 to choose various settings for viewing. In one embodiment, the setup menu 324 provides the user with a spoken languages button 326, a captioning/subtitles button 328, and a return to film button 330. The spoken languages button 326 allows a user to view the feature presentation 318 in different languages. Further, the captioning/subtitles button 328 allows the user to view the feature presentation 318 with captions and/or subtitles. In addition, the captioning/subtitles button 328 can provide the user with a choice for closed captioning. In one embodiment, the user can chose different viewing options such as widescreen or fullscreen. Finally, the user can return to the feature presentation 318 by pressing the return to film button 330.

In addition, the user can press the bonus materials button 314 in the main menu 306 to view various bonus materials. The bonus materials can include outtakes & bloopers, games, virtual tours, encyclopedias, aquariums, karaoke, making of music videos, backstage footage, behind the scenes footage, filmmaker's commentary, recording sessions, etc. In one embodiment, the bonus materials menu 332 includes a featurette button 334, a game button 336, a multiangle button 338, a still gallery button 340, an audio commentary button 342, and a main menu button 344. The bonus materials menu 332 can include choices for viewing other types of bonus materials. The user can press the featurette button 334 to view a featurette. Further, the user can press the game button 336 to play a game. In addition, the user can press a multiangle button 338 to view a portion of a scene, a scene, a plurality of scenes, or the entire feature presentation 318. Further, the user can press a still gallery button 340 to view still images. The user can also press an audio commentary button 342 to hear commentary during the feature presentation 318. Finally, the user can press a bonus materials main menu button 344 to return to the main menu 306.

The user can also press a sneak peaks button 316 in the main menu 306 to view a plurality of sneak peaks 348. The user can then return to the main menu 306 by pressing a sneak peeks main menu button 350.

Figure 4:
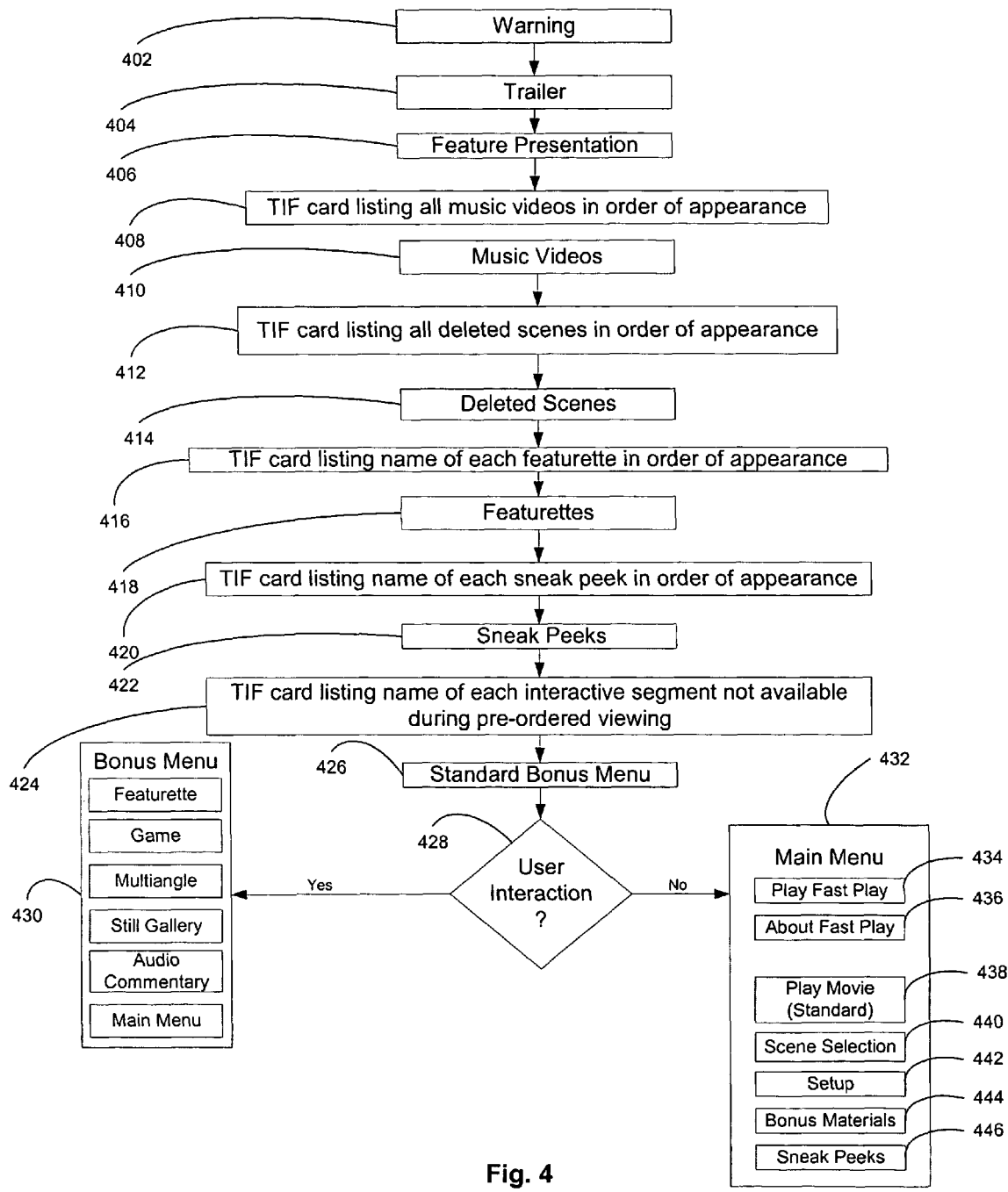
FIG. 4 illustrates an embodiment in which instructions are stored on a DVD for displaying the contents of a DVD in a pre-ordered viewing format.

FIG. 4 illustrates an embodiment in which instructions are stored on a DVD for displaying the contents of a DVD in pre-ordered viewing format. In one embodiment, the contents on the DVD can be displayed in the following order. A warning 402 is displayed. In one embodiment, a plurality of warnings are displayed. A trailer 404 follows the warning 402. In one embodiment, a plurality of trailers are displayed. A feature presentation 406 follows the trailer 404. In one embodiment, a music video listing 408 is then displayed to inform the user of the music videos that will be displayed in the order of appearance. In one embodiment, the listing of music videos is accomplished through the use of a tagged image file format ("TIFF") card. A plurality of music videos 410 are then displayed. In alternate embodiments, the plurality of music videos 410 is displayed without listing the videos to be displayed prior to the displaying of the music videos 410. In one embodiment, a deleted scenes listing 412 is then displayed to inform the user of the deleted scenes that will be displayed in order of appearance. A plurality of deleted scenes 414 are then displayed. In one embodiment, a featurettes listing 416 is displayed to inform the user of the featurettes that will be displayed in order of appearance. A plurality of featurettes 418 can then be displayed. In one embodiment, a sneak peaks listing 420 is then displayed to inform the user of the sneaks peaks that will be displayed in order of appearance. A plurality of sneaks peaks 422 is then displayed. One of ordinary skill in the art will recognize that the plurality of any of the contents discussed above, e.g. the plurality of music videos 410, includes an individual block of data such as an individual music video 410. One of ordinary skill in the art will also recognize that the pre-ordered viewing format may only have listings for a portion of the contents of the DVD to be displayed. Similarly, the pre-ordered viewing format may not have listings for any of the contents of the DVD to be displayed.

In one embodiment, an interactive segments listing 424 available to the user is then displayed. A standard bonus menu 426 is then displayed. A decision block 428 determines if there is any user action within a given time period after the standard bonus materials is displayed. If the user selects the bonus materials, the bonus menu 430, which is similar to the bonus materials menu 332, is displayed. In some configurations, the pre-ordered viewing format is a sequenced ordering of all the contents stored on the DVD. In other configurations, the pre-ordered viewing format is a sequenced ordering of some of the contents stored on the DVD. Buttons can be displayed for interactive segments (not shown) that were not displayed during the pre-ordered viewing format.

In one embodiment, if the user does not make a selection within the given time period, a timeout occurs and the DVD loops back to the warning 402 to play the DVD again. In another embodiment, if the user does not make a selection, a timeout occurs and a Fast Play main menu 432 is displayed. The term "Fast Play" is used to denote the pre-ordered viewing mode. One of ordinary skill in the art will recognize that a variety of terms can be used to denote the pre-ordered viewing mode. The Fast Play main menu 432 provides the user with the choice of viewing the DVD in either the Fast Play mode or the standard DVD viewing mode. The user can view the DVD in the Fast Play mode by pressing a Play Fast Play button 434. If the user would like to learn more about Fast Play prior to making a choice, the user can press an About Fast Play button 436 to view or listen to information about Fast Play. On the other hand, if the user would like to view the movie in the standard DVD viewing format, the user can press a Play Movie (Standard) button 438. The user can also press a scene selection button 440 to view different scenes, a setup button 442 to adjust the setup, a bonus materials button 444 to view bonus materials, or a sneak peeks button 446 to view sneak peeks. In one embodiment, if the user does not make a selection from the main menu 432 within a given time period, a timeout occurs and the DVD plays in Fast Play mode by looping back to the warning 402. The DVD then continues to be played in the pre-ordered viewing format.

The pre-ordered viewing format is not limited to the sequence as discussed above. Rather, the pre-ordered viewing format can include variations in the order of the contents of the DVD that are displayed.

Figure 5:
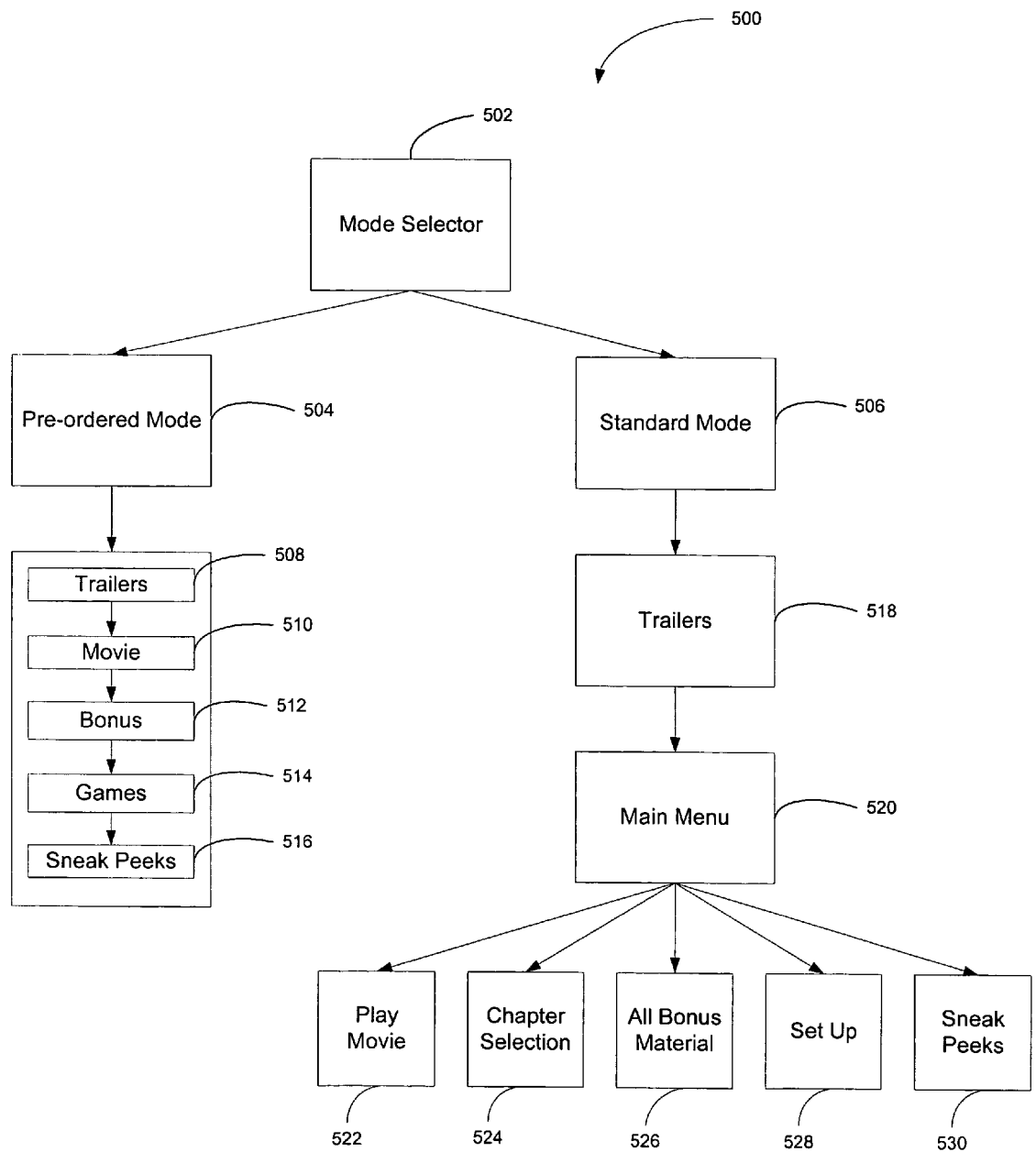
FIG. 5 illustrates an embodiment in which an instruction set selection system selects a mode for viewing the contents of the DVD.

FIG. 5 illustrates an embodiment in which an instruction set selection system 500 selects a mode for viewing the contents of the DVD. A mode selector 502 determines whether the viewing modes is a pre-ordered mode 504 or a standard mode 506. The mode selector 502 can set either the pre-ordered mode 504 or the standard mode 506 as the default mode. Further, the user can submit a request to the mode selector 502 to change modes. The user can submit the request through a menu selection, by pressing a button on a remote control, or by pressing a button positioned on the housing of the DVD player. The mode selector 502 can be a software configuration, a hardware configuration, or software and hardware configuration that can set a viewing mode and that can switch from one viewing mode to another viewing mode. One of ordinary skill in the art will recognize that the mode selector 502 is not limited to the pre-ordered mode and the standard mode but may encompass multiple other modes.

If the mode selector sets the pre-ordered mode as the viewing mode, the user can automatically view a sequence of contents stored on the DVD without interacting with the DVD. In one embodiment, the pre-ordered mode is set to play trailers 508, a movie 510, bonus materials 512, games 514, and sneak peeks 516. The contents of the sequence can be a portion of the contents stored on the DVD or the entirety of the contents stored on the DVD. If a portion of the contents are selected for the pre-ordered mode, the selection can be based on any number of factors, including but not limited to consumer based research. For instance, certain bonus materials can be selected according to consumer based research as to the types of bonus materials users would like to view. In one embodiment, the consumer based research can be based on demographics. The actual ordering of the contents in the pre-determined mode can also be based on consumer based research. Demographics can also be used for determining the ordering of the contents in the pre-determined mode.

If the mode selected by the mode selector 502 is the standard mode 506, trailers 518 are displayed followed by a main menu 520. The user can select a play movie button 522, a chapter selection 524, an all bonus material button 526, a setup button 528, or a sneak peeks button 530 from the main menu 520. One of ordinary skill in the art will recognize that the main menu 520 can display a variety of other buttons that will allow the user to view the contents of the DVD.

The bimodal configuration as discussed above can be used with contents stored on a plurality of mediums. For instance, the bimodal configuration can be used with multiple DVD sets such as a two-disc box set. If the DVD player only houses one DVD at a time, a user may need to insert a second DVD. In one embodiment, an instruction can be displayed after the end of the sequence for inserting the second DVD. In another embodiment, the instruction can be heard through an audio message. In one embodiment, the DVD player can house multiple DVDs. The user can then insert all of the DVDs from the box set into the DVD player. The pre-determined mode of the bimodal configuration will have an instruction for moving to the next DVD in the box set and for automatically playing the next DVD so that the user will not need to provide any additional interaction other than inserting the DVDs of the box set into the DVD player. Further, the standard viewing mode can also have an instruction for moving to the next DVD in the box set and for automatically playing the next DVD. In one embodiment, an index is provided for the different contents on the multiple DVDs in the DVD box set so that users can appropriately navigate through the DVDs if they wish to use the standard viewing mode.

Further, the bimodal configuration as discussed above can be used with older DVD systems. In one embodiment, new DVD hardware is not needed because the bimodal configuration can be stored on the DVD itself. The bimodal configuration can instruct older DVD players to play in either the pre-determined mode or in the standard mode. In addition, the bimodal configuration can be used with DVDs in different types of DVD players. For instance, the bimodal configuration can be used with DVDs that are inserted into DVD players positioned in the rear seats of automobiles or in other forms of transportation. The bimodal configuration can be used in conjunction with a DVD that is inserted into any sized DVD player. Further, the bimodal configuration can be used in conjunction with a DVD that is inserted into a DVD player positioned in any location, integrated with any other electronic equipment, or integrated into any other potential viewing area. In addition, the bimodal configuration can be used with any advances in data storage technology.

While the above description contains many specifics, these should not be construed as limitations on the scope of the invention, but rather as an exemplification of preferred embodiments thereof. The invention includes any combination or subcombination of the elements from the different species and/or embodiments disclosed herein. One skilled in the art will recognize that these features, and thus the scope of the present invention, should be interpreted in light of the following claims and any equivalents thereto.

We claim:

1. A method of automatically playing the contents of a tangible data storage medium in a medium player, the method comprising:
    providing a medium main menu for a predetermined time period after insertion of the tangible data storage medium into the player, prior to playing the content of the tangible data storage medium, the medium main menu inviting an interaction by presenting a choice between a fast play option and a standard play option during the predetermined time period; and
    proceeding to play the contents of the tangible data storage medium in an uninterrupted sequence, including a feature presentation, under the fast play option after the pre-determined timeout has lapsed without any interaction having been received;
    wherein the fast play option comprises an automatically pre-ordered viewing mode that does not require the user to interact with the medium player for viewing the contents of the tangible data storage medium in a predetermine order; and
    wherein the standard play option requires user interaction to play the contents of the tangible data storage medium.

2. The method of claim 1, wherein the predetermine order provides that at least one trailer is displayed to the user prior to display of the feature presentation.

3. The method of claim 1, wherein the predetermine order provides that at least one sneak peek is displayed to the user after display of the feature presentation.

4. The method of claim 1, wherein the predetermine order provides that at least one deleted scene is displayed to the user after display of the feature presentation.

5. The method of claim 1, wherein the predetermine order provides that bonus material is displayed to the user after display of the feature presentation.

6. The method of claim 1, wherein the predetermine order provides that a still gallery is displayed to the user after display of the feature presentation.

7. A tangible data storage medium having a plurality of data blocks stored therein that can be viewed by playing the tangible data storage medium in a medium player, wherein the plurality of data blocks include a feature presentation, the tangible data storage medium having recorded:

a menu instruction set that instructs the medium player to display a main menu for a predetermined amount of time, the main menu providing a fast play option and a standard play option upon insertion of the tangible data storage medium into the player; and a second instruction set that instructs the medium player to play the plurality of data blocks of the tangible data storage medium in response to commands under the standard play option that determine the plurality of data blocks of the tangible data storage medium to be played;

a third instruction set that instructs the medium player, if no commands are received from the user within the predetermined time, to play the plurality of data blocks, including the feature presentation, automatically according to the fast play option in a pre-ordered viewing order.

8. The tangible data storage medium of claim 7, wherein the tangible data storage medium is a digital video disc.

9. The tangible data storage medium of claim 7, wherein the medium player is a digital video disc player.

10. The tangible data storage medium of claim 7, wherein the medium player is operable in conjunction with video display that can display the plurality of data blocks of the tangible data storage medium.

11. The tangible data storage medium of claim 7, wherein the plurality of data blocks include at least one movie.

12. The tangible data storage medium of claim 7, wherein the plurality of data blocks include at least one trailer.

13. The tangible data storage medium of claim 7, wherein the plurality of data blocks include bonus material.

14. The tangible data storage medium of claim 7, wherein the plurality of data blocks include at least one sneak peak.

15. A method of playing a plurality of data blocks of a tangible data storage medium by a medium player, wherein the plurality of data blocks include a feature presentation, the method comprising:

presenting to a user for a predetermined amount of time a menu providing a fast play option and a standard play option upon insertion of the tangible data storage medium in a player;

automatically playing the plurality of data blocks of the tangible data storage medium including the feature presentation according to the fast play option in a pre-determined uninterrupted sequence if a play option selection is not received within the predetermined time;

upon receiving an input during play in the uninterrupted sequence played according to the fast play option, interrupting the playing of the plurality of data blocks of the tangible data storage medium in the pre-determined uninterrupted sequence; and presenting an alternate menu corresponding to the standard play option to enable a selection of the plurality of the data blocks of the tangible data storage medium.

16. The method of claim 15, wherein the tangible data storage medium is a digital video disc.

17. The method of claim 16, wherein the plurality of data blocks of the digital video disc are played using a digital video disc player.

18. The method of claim 15, wherein the plurality of data blocks include at least one movie.

19. The method of claim 15, wherein the plurality of data blocks include at least one trailer.

20. The method of claim 15, wherein the plurality of data blocks include bonus material.

21. The method of claim 15, wherein the plurality of data blocks include at least one sneak peak.

22. A method of playing a plurality of data blocks of a medium by a medium player, wherein the plurality of data blocks include a feature presentation, the method comprising:

providing a single main menu at start up for selecting the plurality of data blocks of the medium to be viewed, the single main menu further comprising:

a first fast play option menu selection for playing the plurality of data blocks including the feature presentation in a predetermined uninterrupted sequence and a second standard play option menu selection for a user definable interactive viewing sequence of a subset of the plurality of data blocks; and automatically selecting the fast play option and playing the plurality of data blocks of the medium including the feature presentation in a pre-determined uninterrupted sequence that corresponds to the first menu selection in the event a selection of either of the two menu selections is not received within a pre-determined time interval.

23. The method of claim 22 further comprising interrupting the playing of the plurality of data blocks of the medium in the pre-determined sequence upon receiving an input after the pre-determined time interval.

24. The method of claim 23, further comprising providing a menu so that selection can be made of either the data blocks of the medium to be viewed or to continue viewing the plurality of data blocks of the medium in the pre-determined sequence.

25. The method of claim 24, wherein the playing of the data blocks of the medium in the pre-determined sequence resumes at the point of interruption.

26. The method of claim 24, further comprising playing the plurality of data blocks of the medium chosen from the menu.

27. The method of claim 26, further comprising resuming the playing of the plurality of data blocks chosen from the menu at the point of interruption if the playing was interrupted to view the menu.

28. A method of providing the option of selecting a mode for displaying the contents of a medium, wherein a featured presentation is included within the content of the medium, the method comprising:

automatically displaying a menu upon insertion of the medium into a medium player, prior to playing the contents of the medium, the menu providing a fast play mode option and a standard play mode option, wherein one of the options can be selected within a predetermined time period;

displaying the contents of the medium in the fast play mode that causes the contents of the medium including the featured presentation to be played in a predetermined uninterrupted sequence if an interaction from the user is not received within the predetermined time period;

wherein the standard play mode requires user interaction to play the contents of the medium.

29. A method of providing an option of selecting a mode for displaying the contents of a medium, wherein a featured presentation is included within the content of the medium, the method comprising:

displaying a menu upon insertion of the medium into the medium player, the menu providing a fast play mode option and a standard play mode option, wherein selection of one of the options can be made within a predetermined time period; and automatically displaying the contents of the medium in the fast play mode that causes the contents of the medium including the featured presentation to be played in a predetermined uninterrupted sequence if an interaction is not received within the predetermined time period, wherein the response to receiving an input of the standard play option comprises selecting a second mode wherein the contents of the medium to be displayed can be selected; and in response to receiving the input of the standard play option, displaying the contents of the medium in the second mode according to a second set of instructions.

30. The method of claim 29, wherein the medium is a digital video disc.

31. The method of claim 29, wherein the input is effectuated by the making a selection from a menu.

32. A medium player being configured to execute a plurality of instructions upon insertion of a tangible data storage medium into the player, wherein the instructions are stored on the tangible data storage medium, the instructions comprising:

a first instruction set that instructs the medium player to display a menu providing a fast play and a standard play option, and, if an option is not selected, automatically selecting the fast play option, wherein according to the fast play option, a plurality of data blocks for the medium are played in a pre-determined uninterrupted sequence, wherein the plurality of data blocks include a feature presentation, the pre-determined uninterrupted sequence being in a fixed order; and a second instruction set, if the standard play option is selected, that instructs the medium player to play the plurality of data blocks of the medium in response to commands that determine the order for playing the plurality of data blocks of the medium.

33. A medium player being configured to execute a plurality of instructions upon receipt of the instructions from a tangible data storage medium inserted into the player, the instructions comprising:

a first instruction set that instructs the medium player to display a menu providing a fast play and standard play option, and, if an option is not selected within a predetermined time, to automatically select the fast play option and play a plurality of data blocks including a feature presentation in a predetermined, fixed order; and a second instruction set that instructs the medium player to play the plurality of data blocks of the tangible data storage medium in response to commands under the standard play option that determine the plurality of data blocks of the tangible data storage medium to be played.

* * * * *